D. LEVINSON.
WHEEL.
APPLICATION FILED JUNE 7, 1918.

1,297,876. Patented Mar. 18, 1919.

INVENTOR
D. Levinson
BY
his ATTORNEY

UNITED STATES PATENT OFFICE.

DAVID LEVINSON, OF NEW YORK, N. Y.

WHEEL.

1,297,876.  Specification of Letters Patent.  Patented Mar. 18, 1919.

Application filed June 7, 1918. Serial No. 238,793.

*To all whom it may concern:*

Be it known that I, DAVID LEVINSON, a citizen of the United States, and a resident of the city of New York, in the county of New York and State of New York, have invented certain new and useful Improvements in Wheels, of which the following is a specification.

The present invention relates to wheels for vehicles, and pertains especially to a cushioning device therefor.

The main object of the present invention is to provide a resilient, non-puncturable wheel, designed to dispense with the pneumatic tires now commonly used.

Another object of the invention is to provide a wheel of the character specified, which can be easily assembled, even without the aid of a skilled mechanic.

A further object of the invention is to generally improve and simplify the construction of the wheels heretofore in use, so that the same can be manufactured on a commercial scale, or in other words which are so simple to produce as not to be beyond the reasonable cost of such a device.

A still further object of the invention is to so construct the wheel that it is adapted for use even when its cushioning device is out of order.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
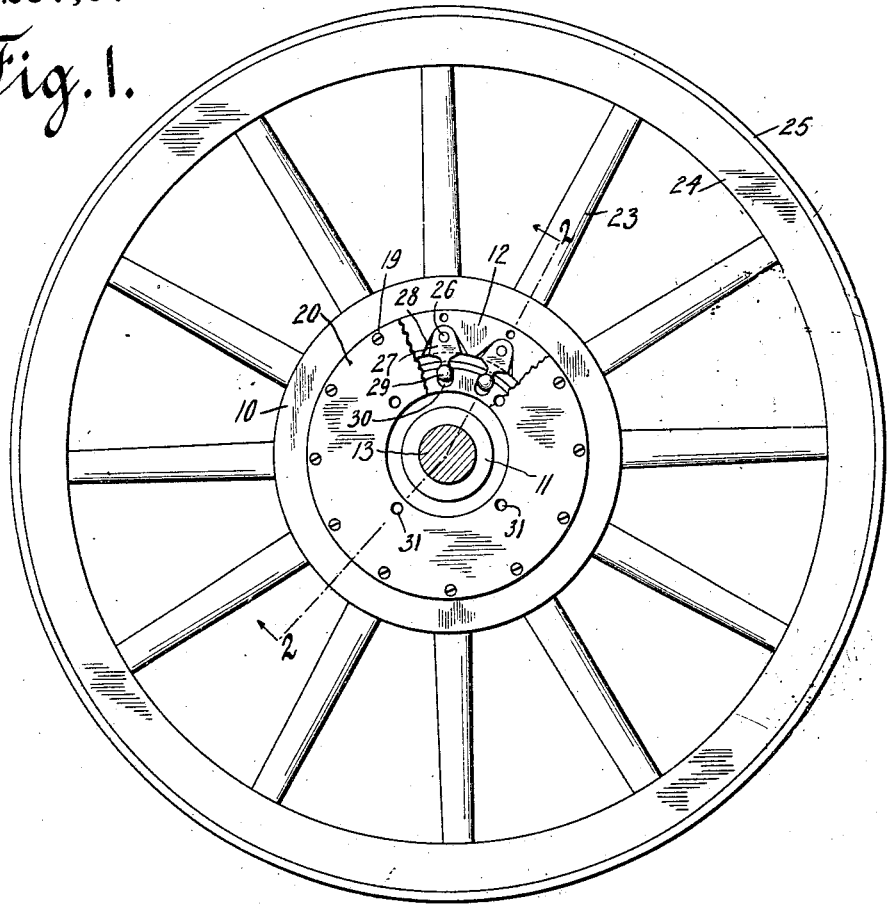
Figure 2:
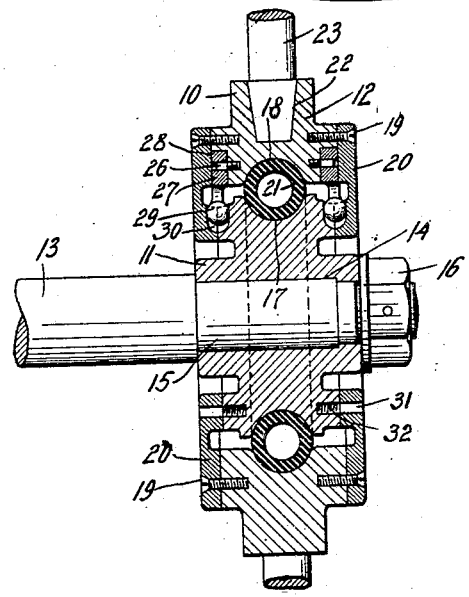

Figure 1 is a side elevation, of a wheel constructed in accordance with the present invention, certain parts being broken away in order to clearly show the interior construction; and Fig. 2 is a section taken on line 2—2 of Fig. 1, on a larger scale.

In the drawings, the numeral 10 indicates the hub of the wheel, comprising an inner section 11 and an outer section 12, which are movable relative to each other in a plane at right angles to the longitudinal axis of the wheel axle 13. These two hub sections are normally held in concentric or nearly concentric positions by yielding means, hereinafter to be described. The section 11 of the hub is provided centrally with a bore 14, through which extends the reduced end 15 of the wheel axle, said hub section being held on the said axle in any suitable manner, for instance by a nut 16. The hub section 11 is thus of annular configuration, and is provided with a peripheral groove 17, that is substantially semi-circular in cross-section. With this groove registers a similar groove 18 in the inner face of the section 12 of the hub, said last named section being ring-shaped. To prevent the hub section 12 from shifting laterally in relation to the hub section 11, there are attached, for instance by screws 19, rings 20 to the two plane faces of the section 12. These rings abut against the plane faces of the hub section 11, and are sufficiently spaced to permit of an easy movement of the hub section 12 relative to the section 11 thereof in a plane at right angles to the longitudinal axis of the axle 13.

In the registering grooves 17 and 18 is disposed a resilient ring-shaped body 21, of circular cross-section, preferably an endless rubber tube, that is inflated in the well-known manner. This resilient body has a tendency to maintain the two sections of the hub in concentric position, but, when compressed, permits of a relative motion of the said two sections, the outer diameter of the section 11 being substantially smaller than the inner diameter of the section 12.

In the hub section 12 are formed spoke-sockets 22, in which are seated spokes 23, connecting the hub with the felly 24 of the wheel. To this felly is attached in any suitable manner a tire 25, of any preferred construction.

In order to prevent the section 12 from moving to an appreciable extent circumferentially in relation to the hub section 11, there are pivoted to both plane faces of the section 12 at 26 lugs 27. These lugs extend radially, in their outer portions being seated in recesses 28 in the hub section 12, while their inner ends 29, which are ball-shaped, are seated in recesses 30. Each of the recesses 30 is formed in one of the plane faces of the hub section 11 and the juxtaposed ring 20. The recesses 30 are radially arranged, as clearly appears from Fig. 1 of the drawings. The recesses 28 in the hub section 12 are larger than the portions of the lugs 27 seated therein, to permit the latter to swing around their pivots for a purpose hereinafter to be described. The recesses 30 are each of a length that exceeds the diameter of the ball-shaped end 29 of a lug, to allow of a relative movement of the two hub sections.

The operation of this device is as follows:—

When the wheel, in traveling, strikes an obstruction on the road, the resilient body 21, interposed between the two sections of the hub, yields sufficiently, so that the wheel may pass over the obstruction without jarring, the hub section 12 yielding easily and being brought back to its normal position without communicating the jar or shock to the wheel axle and to the body of the vehicle arranged thereon. The lugs 27 move back and forth in the recesses 30 and do in no way affect the resiliency of the wheel; they prevent however a creeping of the hub section 12 in relation to the hub section 11.

If the resilient tube 21 bursts or is otherwise injured, it can be easily replaced. If no spare tube is on hand, the two sections of the hub are bolted together in concentric positions. For this purpose, there are formed in the rings 20 and in the adjoining plane faces of the hub section 11 registering holes 31 and 32, respectively. The holes 32 in the hub section 11 are screw threaded, the said threads being adapted to mesh with bolts inserted into the same through the holes 31 in alinement therewith.

The resiliency of the wheel is thus, of course, lost, but the wheel may be used until a tube 21 can be procured.

What I claim is:—

1. In a wheel hub, the combination with an annular axle carrying inner member, of a spoke carrying ring-shaped outer member capable of movement in the plane of the wheel relative to said inner member, a resilient body interposed between said two members, and lugs pivoted to one of said members having ball-shaped free ends, the other member having recesses in which the ball-shaped ends of said lugs are seated.

2. In a wheel hub, the combination with an annular axle carrying inner member, of a spoke carrying ring-shaped outer member capable of movement in the plane of the wheel relative to said inner member, a resilient body interposed between said two members, and lugs pivoted to one of said members having ball-shaped free ends, the other member having recesses in which the ball-shaped ends of said lugs are seated, the length of each recess being greater than the diameter of the ball-shaped end of a lug.

Signed at New York, in the county of New York, and State of New York, this 31st day of May, A. D. 1918.

DAVID LEVINSON.